United States Patent [19]
Downey, Jr.

[11] Patent Number: 4,759,611
[45] Date of Patent: Jul. 26, 1988

[54] LIQUID CRYSTAL DISPLAY HAVING SILYLATED LIGHT POLARIZERS

[75] Inventor: John F. Downey, Jr., Lexington, Mass.

[73] Assignee: Polaroid Corporation, Patent Department, Cambridge, Mass.

[21] Appl. No.: 944,429

[22] Filed: Dec. 19, 1986

[51] Int. Cl.$^4$ ............................ G02F 1/13; G02B 5/30
[52] U.S. Cl. .................................... 350/337; 350/340; 350/341
[58] Field of Search ............... 350/337, 341, 340, 396; 428/452; 427/132; 526/279; 252/299.4, 299.5

[56] References Cited

U.S. PATENT DOCUMENTS

| | | | |
|---|---|---|---|
| Re. 23,297 | 11/1980 | Hyman, Jr. et al. | 88/65 |
| 2,445,555 | 7/1948 | Binda | 88/65 |
| 2,445,581 | 7/1948 | Land | 350/396 |
| 3,941,901 | 3/1976 | Harsch | 427/108 |
| 3,990,781 | 11/1976 | Gum | 350/160 |
| 4,150,877 | 4/1979 | Kobale et al. | 350/341 |
| 4,151,326 | 4/1979 | Funada et al. | 252/299.4 |
| 4,166,871 | 9/1979 | Schuler, Norman W. | 427/163 |
| 4,235,526 | 11/1980 | Berman et al. | 350/344 |
| 4,297,401 | 10/1981 | Chern et al. | 428/1 |
| 4,357,374 | 11/1982 | Ogawa | 428/1 |
| 4,381,886 | 5/1983 | Yokokura et al. | 350/341 |
| 4,387,133 | 6/1983 | Ichikwa | 428/215 |
| 4,469,409 | 9/1984 | Nakamo et al. | 350/341 |
| 4,472,027 | 9/1984 | Okubo et al. | 350/340 |
| 4,544,724 | 10/1985 | Sogah et al. | 526/279 |
| 4,564,266 | 1/1986 | Durand et al. | 350/340 |
| 4,603,057 | 7/1986 | Ueno et al. | 427/132 |
| 4,617,239 | 10/1986 | Maruyama et al. | 428/452 |
| 4,659,523 | 4/1987 | Rogers et al. | 264/1.3 |
| 4,674,840 | 6/1987 | Bennet | 350/337 |

FOREIGN PATENT DOCUMENTS

| | | | |
|---|---|---|---|
| 0258518 | 12/1985 | Japan | 252/299.5 |
| 0258517 | 12/1985 | Japan | 252/299.5 |

OTHER PUBLICATIONS

F. J. Kahn, in "Orientation of Liquid Crystals by Surface Coupling Agents", Appl. Phys. Lett., vol. 22, No. 8, Apr. 15, 1973.

B. Arkles, Petrach Systems, Inc., "Silane Coupling Agent Chemistry", pp. 71-76 (1984).

*Primary Examiner*—Stanley D. Miller
*Assistant Examiner*—Huy Mai
*Attorney, Agent, or Firm*—Louis G. Xiarhos

[57] ABSTRACT

A liquid crystal display is disclosed having silylated polyvinyl alcohol polarizing layers.

13 Claims, 1 Drawing Sheet

LIQUID CRYSTAL DISPLAY HAVING SILYLATED LIGHT POLARIZERS

CROSS-REFERENCE TO RELATED APPLICATION

This application is related to commonly assigned and copending U.S. application Ser. No. 945,301, entitled "Stabilized Light-Polarizing Material and Method for Preparing Same" by John F. Downey, Jr.

BACKGROUND OF THE INVENTION

The present invention relates to electro-optical devices, such as liquid crystal displays.

More specifically, this invention relates to an improved liquid crystal display of the type disclosed in copending and commonly assigned application, U.S. Ser. No. 564,753, entitled "Liquid Crystal Display" filed on Dec. 22, 1983 by S. Bennett and now U.S. Pat. No. 4,674,840.

Included in such a liquid crystal display, in sequence from the viewing surface to the medial plane of the display, are a substantially transparent polymeric layer; a polarizing layer; optionally, a protective barrier layer; a transparent electrode structure; an alignment layer; and a layer of liquid crystal material. While liquid crystal displays of the type described in the aforementioned application of S. Bennett can be fabricated by automated production methods and show desirable electro-optical performance and efficiency, there is an ongoing interest in improving the operational efficiency of such displays. It will be appreciated that improvements in the manufacture of liquid crystal displays of the aforementioned type, such that the displays exhibit sustained electro-optical efficiency for a prolonged period, will be of particular interest in the fabrication of such liquid crystal displays.

SUMMARY OF THE INVENTION

It has been found that the useful life of a liquid crystal display of the aforementioned construction can be substantially prolonged, by using as the light-polarizing layer therein, a polyvinyl alcohol-based linear dichroic light-polarizing layer having a silylated surface. The improved stability of the light-polarizing layer, by reason of the silylated surface, reduces changes in both physical appearance and conductivity of electroconductive materials of such displays.

In essence, the present invention provides an improved liquid crystal display structure. Included in it is a pair of first and second laminate assemblies. These assemblies are spaced from one another in a substantially parallel relationship. A seal means confines a layer of liquid crystal material between them. Each of the laminate assemblies includes, in order from the liquid crystal material layer, an alignment layer; a conductive electrode material; a polyvinyl alcohol linear dichroic polarizer having a silylated surface; and a polymeric support.

In a preferred embodiment, an organosilane compound is coupled to a polyvinyl alcohol material of the polarizer layer. The coupling is done in a manner, whereby the hydroxyl content of the polyvinyl alcohol polarizer is reduced substantially by organosilylation occurring at the hydroxyl sites on the surface of the polyvinyl alcohol.

While applicant does not wish to be bound by any particular theory or mechanism in explanation of the phenomenon by which the prolongation of the useful life of an electrode material on a silylated polarizer is realized, it is believed that the treatment of a polyvinyl alcohol polarizer with an organosilane compound promotes an improvement in the physical stability of the polarizer and renders the polarizer less prone to physical changes promoted by conditions of high temperature and humidity. The improved stability of the polarizer layer is believed to benefit, in turn, the stability of electrodes formed thereon.

The foregoing organosilane treatment provides a silylated polyvinyl alcohol polarizing layer which is substantially stable to high humidity and heat conditions. Importantly, the treatment does not cause degradation of the optical anisotropy characteristics of the polyvinyl alcohol layer which is critical to successful performance of a liquid crystal display.

Objects and scope of applicability of the present invention will become apparent from the detailed description to follow, taken in conjunction with the accompanying drawings in which like parts are designated by like reference numerals.

DESCRIPTION OF THE PREFERRED EMBODIMENT

Figure 1:
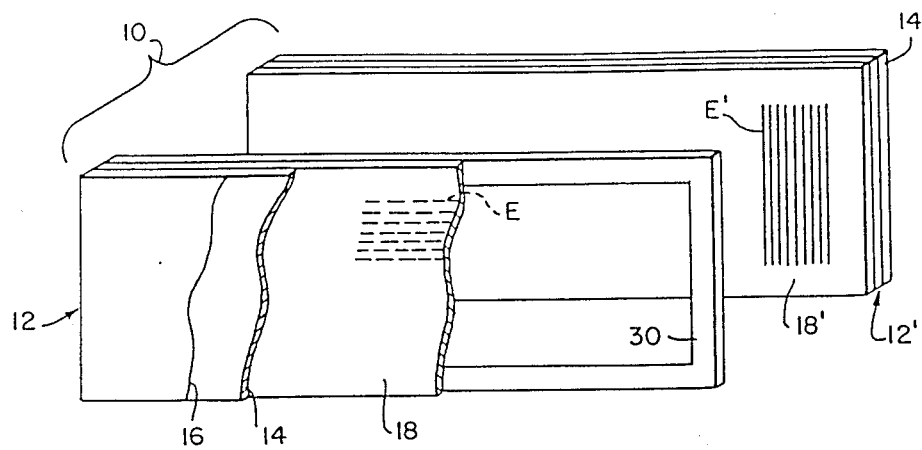
FIG. 1 is an exploded isometric view of a liquid crystal display in accordance with the present invention.

A liquid crystal display in accordance with the present invention is illustrated in exploded isometric view in FIG. 1 and generally referred to therein by the reference character 10. The liquid crystal display 10 includes front and rear laminate assemblies 12 and 12' which, when assembled together with a liquid crystal layer, form the completed liquid crystal display. the front and rear assemblies 12 and 12' may be constructed in identical fashion, or one of the assemblies may be modified depending upon the type of display desired to include a reflector or transreflector layer, as described more fully below.

The laminate assemblies 12 and 12' each include transparent substrates 14 and 14' which provide primary mechanical support for the completed liquid crystal display. The substrates 14 and 14' are preferably fabricated from a transparent or translucent polymeric material. Substrate materials 14 and 14' will desirably be flexible sheet materials so as to facilitate handling and manufacture of the liquid crystal display devices hereof according to a continuous method. Polymeric film materials suited to use herin include cellulose esters such as nitrocellulose, cellulose acetate or cellulose acetate butyrate, polyesters, polycarbonates, vinyl polymers such as acrylics, or other polymers that can be provided in a sheet-like light-transmissive form.

The polyesters are especially useful from the standpoints of low cost and ready availability and ease of handling in manufacture. Typically such polyester materials will be biaxially oriented and will exhibit birefringence. The birefringent character of such support materials is not a detriment to the operation of the devices hereof inasmuch as the biaxially oriented and birefringent support materials will be positioned in such devices outwardly of the light-polarizing and other electro-optical elements of the devices hereof. A preferred polyester is polyethylene terephthalate available under the Mylar and Estar tradenames, although other polyethylene terephthalate materials can be employed.

The thickness of the substrates 14 and 14' should be sufficient to impart the desired structural strength to the final liquid crystal display 10. In accordance with one preferred embodiment of the present invention, the substrates 14 and 14' are 7 mils. thick (about 0.178 mm).

If desired, the support substrates 14 and 14' may be provided with exterior overcoats or layers 16 and 16' that function as antireflection coatings or antiabrasion coatings. A prefererred material for use as an exterior protective coating for polyethylene terephthalate is a low index of refraction fluorinated polymer, preferably coated at a quarter wave optical thickness for visible light. Fluorinated polymers and methods for their application to polyester substrate materials are described in detail in U.S. Pat. No. 4,066,814 to Chiklis and can be suitably employed herein.

Silylated polarizing layers 18 and 18' are shown laminated to the support substrates 14 and 14', respectively, by means of an intermediate transparent adhesive, generally indicated at 20 and 20', respectively. Layers 18 and 18', which may be of the same or different polarizing material, comprise polyvinyl alcohol linear dichroic light-polarizing material and are silylated in the manner described hereinafter. It will be preferred that each of layers 18 and 18' comprise a single layer of silylated light-polarizing material so as to minimize the thickness of the liquid crystal display device. In general, the polarizing layers will have a thickness in the range of about 0.1 to 3 mils (about 0.0025 to 0.076 mm.).

Silylated polarizing layers 18 and 18' can be prepared by the silylation treatment (using an organosilane treatment described in detail hereinafter) of polyvinyl alcohol light-polarizing materials known in the art. Useful light-polarizing materials for this purpose include the stretched (oriented) polyvinyl alcohol polarizers stained according to knwon methods with a dichroic dye such as iodine or having polyvinylene light-polarizing molecules. Typically, such polarizing materials will be borated for stability and can be silylated for use herein. A preferred polarizing material for use herein in the production of a silylated polarizer layer 18 or 18' is a unitary layer of stretched (oriented) polyvinyl alcohol of about one-mil thickness (0.025 mm.) stained according to known methods with a dichroic dye such as iodine. Such a polarizing material will also preferably have been borated for improved stability. Suitable polarizing layers of this type can be prepared utilizing methods set forth in U.S. Pat. No. Re 23,297 and in U.S. Pat. No. 4,166,871. Another preferred polarizing material is a stretched polyvinyl alcohol sheet containing polyvinylene light-polarizing molecules such as may be provided by hydrochloric acid vapor processing in known manner. Preferably, such polarizing material will also have been borated for improved stability. Suitable methods for the production of such polarizing materials are described in U.S. Pat. No. 2,445,555.

The silylated polarizing layers hereof are shown bonded to transparent substrate materials 14 and 14' which provide primary mechanical support for the completed liquid crystal display. In the manufacture of displays of the present invention, a layer of light-polarizing material can be silylated using an organosilane treating agent and can then be adhesively bonded to substrate material 14 or 14'. Alternatively, and preferably, a layer of polyvinyl alcohol material will first be adhesively bonded to substrate material 14 or 14' and will then be rendered dichroic before being subjected to the silylation treatment. The resulting silylated polarizer exhibits good stability and can be used for deposition thereon of electroconductive material. The axis of polarization of the silylated polarizing layer 18 and 18', whether positioned prior to or subsequent to silylation, can be aligned orthogonally relative to each other or in parallel relation.

The transparent adhesive used between the silylated polarizing layers 18 and 18' and the respective substrates 14 and 14' should be selected for environmental stability and for adherency to both the substrate material and the layers 18 and 18'. Suitable adhesives include polyvinyl alcohol and urethane-based adhesive materials. The thickness of the transparent adhesive layers 20 and 20' is selected to be sufficiently thick to achieve the intended purpose without adversely affecting the optical transmission properties of the completed liquid crystal display. In general, an adhesive layer, having a thickness of up to about 1.0 mil. (about 0.025 mm.) is satisfactory.

In accordance to the present invention, the polyvinyl alcohol polarizer is treated with an organosilane compound. This treatment enhances the stability of the former to high heat and humidity conditions. Essentially, this treatment reduces substantially the hydroxyl content of the polyvinyl alcohol polarizer. This is done in a manner which provides a coupling of organosilane compound at the hydroxyl groups reaction sites. The resultant highly stabilized polyvinyl alcohol polarizer with the silane treatment resists successfully the negative effects brought about by the noted factors of heat and humidity.

To achieve the foregoing benefits, a polyvinyl alcohol polarizer is treated with an organosilane compound capable of reaction with hydroxyl sites on the surface of the polarizer. If desired, an organosilane having groups directly reactable with such hydroxyl groups can be employed. An example of such an organosilane is a trichloroorganosilane, which can, for example, be reacted directly in the presence of an aprotic solvent such as dimethylformamide. In most instances, the organosilylation treatment will be performed using an organosilane which has been first allowed to undergo hydrolysis for conversion of hydrolzyable groups and formation of silanol groups reactive with the polarizer at hydroxyl sites on the surface of the polarizer. Following hydrolysis, the silane solution is applied to the polyvinyl alcohol polarizer at a preselected rate by an appropriate coating, spraying, dipping or like method. A suitable coating device is a slot-head coater. Other suitable coating devices can be used. In any event, the silane solution is applied at a rate which delivers a predetermined amount per unit area which can vary with the particular nature of light polarizing material and the hydroxyl content thereof.

Subsequent to the application step, the treated polarizing layer is heated until dry, under preselected heating conditions. The drying can be done in a conventional drying oven or by application of heated air. In general, temperatures will range from about 120° F. to about 210° F., and preferably in the range of from 190° F. to 200° F.

Methods for the preparation of silylated surfaces (and organosilanes suited to silylation treatments) are known in the art and are described in the review article "Silane Coupling Agent Chemistry" by B. Arkles, Petrach Systems, Inc. (1984).

Organosilane compounds useful in providing the silylated polyvinyl alcohol polarizers hereof, in general, comprise a tetravalent silicon atom having at least one non-hydrolyzable group bonded to the silicon atom by a silicon-to-carbon covalent bond and up to three hydrolyzable groups covalently bonded to the silicon atom. Useful compounds can be represented by the formula

$$R_n\text{—SiX}_{4-n}$$

wherein R is a nonhydrolyzable organic radical; n is an integer of from oe to three; and X is a hydrolyzable group. Typically, n will be the integer one and the nonhydrolyzable group will comprise an organic group such as alkyl, aryl, alkaryl, aralkyl or the like, optionally substituted with a halogen, amino, alkylamino or other substitutent group. Suitable hydrolyzable X groups include alkoxy (e.g., methoxy), acyloxy (e.g., acetyloxy), amino or halo (e.g., chloro). When each X is halo, the organosilane can be reacted directly with hydroxyl groups of the polarizer and hydrolysis for production of silanol groups can be avoided, if desired. Preferred nonhydrolyzable groups are the 3-N-methylamino propyl and N-2-aminoethyl-3-aminopropyl groups represented in the organosilanes of the formula

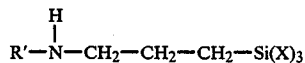

$$R'\overset{H}{\underset{|}{-N}}-CH_2-CH_2-CH_2-Si(X)_3$$

wherein X is a hydrolyzable group such as methoxy and R' is alkyl (e.g., methyl, ethyl) or aminoalkyl (e.g., 2-aminoethyl).

lected should, when combined wit the polarizer, not adversely affect the transmission of the polarizer or adversely affect the desired optical anisotropy of the liquid crystal display. Of course, it is desired that the silane coated polyvinyl alcohol polarizer be chemically compatible with the other components forming the liquid crystal display.

As noted earlier, the organosilane compound will normally be hydrolyzed prior to a coupling reaction whereby the organosilane is covalently bonded to the polarizer surface. Water for hydrolysis can be added to the surface of the polarizer to effect hydrolysis of the organosilane thereto. In general, however, it will be convenient to prepare an aqueous solution of the organosilane and to permit the hydrolysis to occur prior to application of the hydrolyzed solution to the surface of the polarizer. The hydrolyzed organosilane couples to the polyvinyl alcohol polarizer surface when heat is applied.

The silylation of a substrate, as described in the hereinbefore cited review article of B. Arkles, typically involves four steps. The first is hydrolysis of the three labile X groups attached to silicon. Condensation to oligomers follows. The oligomers then hydrogen bond with the OH groups of the substrate. Finally, during drying or curing, a covalent linkage is formed with the substrate. Concommitant with this linkage there is a corresponding loss of water. At the interface there is usually only one bond from each silicon of the organosilane to the substrate. The remaining silanol groups are present either bonded to other silicon atoms or in free form.

Silylation of a polyvinyl alcohol (PVA) polarizer and attachment of the hydrolyzed organosilane to the polymeric backbone of the PVA substrate are represented by the following scheme:

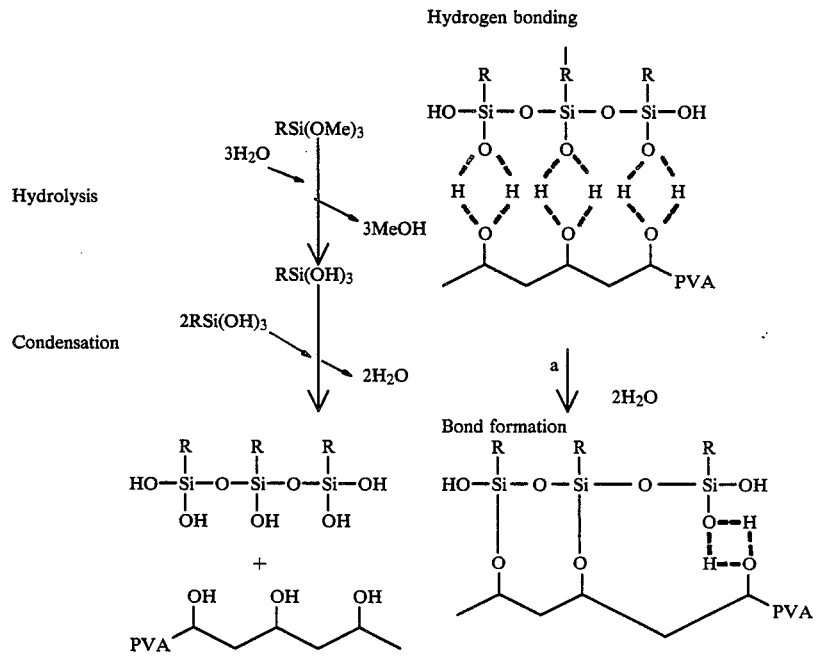

Any of a variety of organosilanes as herein described can be used to provide the polyvinyl alcohol polarizer with a silylated surface. As indicated previously, the organosilane provides the polyvinyl alcohol polarizer with enhanced stability to the heat and humidity conditions enumerated above. Additionally, the silane se- In calculating the amount of silane necessary to treat a surface, the number of reactive sites on a surface area and the type of silane deposition sought (e.g. monolayer, multilayer or bulk) are factors which along with other factors known in this field can be considered.

Whatever silane compound is used, however, it shold remove substantially the hydroxyl content on the top surface of the polyvinyl alcohol substrate, should not affect the optical anisotropy of the liquid crystal display, and should be chemically compatible with the components of the liquid crystal display and not alter the transmission of the polarizer layer.

Transparent conductive structures or layers 22 and 22' are applied over the silane treated polarizing layers 18 and 18'. The transparent conductive structures 22 and 22' may be of any conventional metal or metal oxide material including silver, gold, indium oxide, indium-tin oxide, or the like applied by any conventional method including vapor deposition, magnetron sputtering, or by bombardment from a plasma generator or the like. In addition, the transparent conductive structures 22 and 22' may be subjected to a photoresist etching process to form multi-segment numeric or alphanumeric display patterns or, as shown in FIG. 1, closely spaced parallel electrode lines E and E' which are crossed relative to one another. An addressable picture element (pixel) is defined at the intersection of each of the electrode lines E and E'.

If desired, transparent conductive structures 22 and 22' can comprise multiple layers. Thus, conductive electrodes having improved transmission properties can be provided from a suitable conductive metal, such as silver, sandwiched between layers of a high index of refraction dielectric material such as indium oxide, titanium dioxide or the like. A preferred conductive electrode structure 22 and/or 22' comprises a titania/silver titania arrangement of layers which can be suitably deposited by a vacuum deposition technique over polarizing layers 18 and 18' carried on support materials 14 and 14'. Preferably, the silver layer will contain a minor amount of gold, platinum palladium, or like metal to provide environmental stability. A web of polyester containing a silylated polarizing layer can be passed in a series of passes over vapors of titania, silver and titania, respectively, so as to deposit the desired layers. A slotted mask can be used, if desired, to effect a selective deposition of the vapors in the form of spaced electrode lines which define pixels at the intersection thereof. Alternatively, a continuous coating of electrode material can be subjected to an etching process to selectively remove conductive material to achieve a predetermined electrode pattern.

Figure 2:
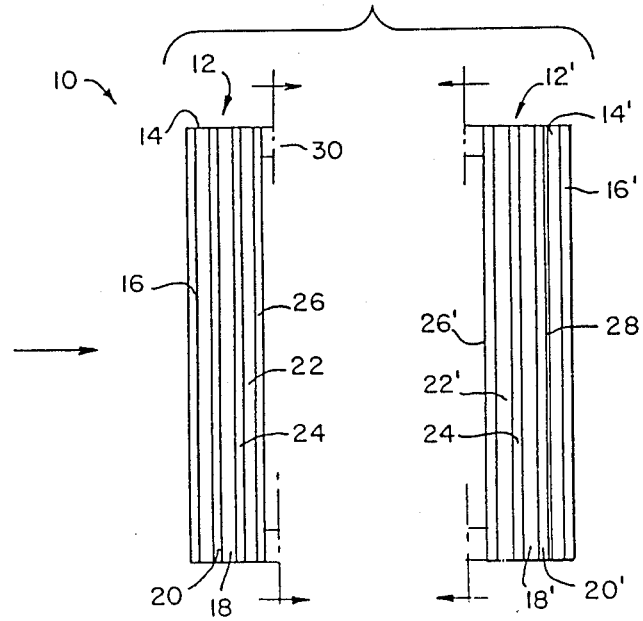
FIG. 2 is a side elevational view, in cross section of the liquid crystal display of FIG. 1.

As shown in FIG. 2, protective layers 24 and 24' can be applied to the confronting surfaces of the polarizing layers 18 and 18', respectively, before the transparent conductive structures or layers 22 and 22' are applied. These protective layers 24, 24' while not essential may be preferred depending upon the particular nature of the polarizer, silylation treatment, liquid crystal or electrode material employed. They can serve important barrier functions in protecting the conductive electrodes from possible corrosive or degradative influences of the silylated polarizing layers 18 and 18' and in preventing the contamination of the liquid crystal material by components of such polarizing layers. In addition, protective or barrier layers 24 and 24' can serve to protect polarizing layers 18 and 18' against the affects of the optically active liquid cyrstal material which may not be chemically compatible therewith. The protective layers 24 and 24' can also assist in protecting the polarizing layers 18 and 18' where, for example, selected areas of the transparent conductive structures 22 and 22' are removed by chemical treatment in a photo-resist etching process. The protective layers 24 and 24' intermediate the silylated polarizing layers and the transparent conductive structures 22 and 22', respectively, may be nitrocellulose or the like. Other materials can, however, be employed. Suitable examples include polyvinylidene chloride, polyvinyl acetal, and the fluorinated polymers, such as are disclosed in U.S. Pat. No. 4,044,814. A preferred material is polyvinylidene chloride. A thickness of between 0.10 micron and 20 microns for the protective layers 24 and 24' is satisfactory.

Alignment layers 26 and 26' are applied over the transparent conductive structures 22 and 22' including the protective layers 24 and 24' where the conductive structures 22 and 22' have been removed. The alignment layers 26 and 26' function to orient the typically elongated liquid crystal molecules in contact with and adjacent the alignment layers in a preferred direction.

The alignment layers 26 and 26' may be of any conventional material and deposited by preferential coating, by vapor deposition, or other processes. The alignment materials can include $S_iO_2$ deposited by preferential vapor deposition or a polyamide or polyimide layer that is subsequently rubbed or buffed to establish an orientation in the desired direction. The alignment layers 26 and 26' may be of polyvinyl alcohol, for example, and approximately 500 angstroms in thickness. Other suitable materials include polyvinylidene chloride, polyvinyl acetal and the fluorinated polymers.

As shown in FIG. 2, the laminate assembly 12', if designated as the rear assembly (opposite the front or viewing assembly), may be provided with a reflector or transflector layer 28 so that the assembled liquid crystal cell 10 can operate in either a reflecting or transmission mode. A suitable material for the reflective layer is aluminum applied by vapor deposition or a metallic foil laminated between substrate 14' and polarizing layer 18', either being sufficient to achieve the desired reflective effect.

The two laminated assemblies 12 and 12' are sealed to one another by a seal 30 which, as shown in FIG. 1, has a rectangular form with length and width dimensions that define the area of the liquid crystal layer. The seal 30 can be fabricated from one of several known materials including a heat-activatable, or pressure-sensitive or radiation-curable adhesive. Suitable adhesives include the polyamide, polyester, polyurethane and polyvinyl adhesives which can be preprinted onto one of the laminated assemblies 12 or 12' in a rectangular or other desired form and then brought into contact and adhered to the other of the laminated assemblies. Preferred seal adhesives include the heat-activatable mixtures of polyester and polyvinyl adhesive compounds and the elastomeric terfluoropolymers described in the copending application of C. K. Chiklis, U.S. Ser. No. 678,113, filed Dec. 4, 1984, and now U.S. Pat. No. 4,647,157.

In general, the liquid crystal material confined between the opposing alignment layers 26 and 26' of the laminated substrates 12 and 12' is approximately 5 to 50 microns in thickness with 8–12 microns being typical. The liquid crystal material can be of any conventional composition. Good results can be obtained, for example, using a liquid crystal material of the known twisted nematic type. The liquid crystal material may include adjuncts such as pleochroic dyes or the like. If desired, the liquid crystal can be sealed and simultaneously filled in accordance with the process described in copending U.S. Patent Application Ser. No. 564,751, of L. Polizzotto, now abandoned.

Spacer means (not shown) are incorporated into the area of the cell occupied by the liquid crystal material to assist in maintaining the thickness of the liquid crystal material. Spacer rods or fibers can be admixed with the liquid crystal material for this purpose. If desired, polymeric spacer elements can be printed by gravure or screen printing of, for example, a hot-melt polyamide or UV-curable acrylate onto alignment layer 24. Alternatively, a dispersion of spacer fibers can be coated and dried to provide suitable spacing means. Suitable spacers and their application are described in the aforementioned and now abandoned U.S. Patent Application Ser. No. 564,751.

The following are examples of silylation treatments of a polyvinyl alcohol polarizer leading to the noted benefits. The polyvinyl alcohol polarizer treated in Examples 1 to 3 hereof comprised a layer of polyvinyl alcohol which was stretched and laminated to a polyethylene terephthalate support sheet of 7 mil (0.18 mm) thickness, treated (protonated) with fuming hydrochloric acid, heated (dehydrated) to introduce dichroic polyvinylene molecules and borated for stability using boric acid, in accordance with conventional methodology.

EXAMMPLE #1

To 1470 g. deionized water was added 30 g. of N-2-aminoethyl-3-amino propyl trimethoxy silane and 0.15 m. of a nonionic fluorinated surfactant (FC 170-C manufactured by the 3M Corporation). After one-half hour standing to allow the silane to hydrolyze, this solution was coated at a flow that would deliver 14 mgs. per square foot (151 mgs.m$^2$) of the silane onto the polyvinyl alcohol polarizer surface supported on the polyester sheet. The coating was dried at 200° F. for approximately three minutes.

EXAMPLE #2

A polarizer layer supported on a polyester sheet, as described, was coated and dried as described in Example 1, but using 1470 g. of a 95% isopropanol −5% water solution based on weight.

EXAMPLE #3

A polarizer layer supported on a polyester sheet, as described, was coated with a hydrolyzed solution of organosilane and heated as described in Example 1, using a solution of 30 g. of 3-N-methylamino propyl trimethoxy silane rather than N-2-amino ethyl-3-amino propyl trimethoxy silane.

The following example illustrates the use of a silylated light polarizer in the manufacture of an electroconductive sheet assembly.

EXAMPLE #4

An electroconductive sheet assembly (identified as ECSA-4) was prepared by vacuum depositing onto the silylated polarizer surface of the article prepared in Example 1, a transparent electrode structure comprising the following layers in sequence: titanium dioxide; silver; gold; and titanium dioxide. For purposes of comparison, a control electroconductive sheet assembly (ECSA-4C) was prepared and was the same as the ECSA-4 assembly, except that, the polarizer layer thereof had not been silylated. Each of the ECSA-4 and ECSA-4C assemblies were evaluated for initial electroconductivity, by resort to conventional resistivity measurement techniques. Each of the assemblies was subjected to environmental storage testing, by storing the assemblies under high heat and humidity conditions, i.e., at 90° F. and 90% R.H. for 42 days. Electroconductivity was determined at the completion of the storage period in each instance. Increase in resistivity (indicating a decrease in conductivity) was less for the ECSA-4 assembly than for the ECSA-4C assembly, indicative of greater storage stability for the electrode material deposited onto the silylated polarizer layer of the ECSA-4 assembly than for the same electrode material deposited onto the non-silylated polarizer layer of the control assembly, ECSA-4C.

Thus, it will be appreciated that as a result of the present invention, an improved and highly effective liquid crystal display is provided by which the principal objective, among others is completely fulfilled. It will equally be apparent and is contemplated that modifications, and or changes may be made in the illustrated embodiments without departure from the present invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. A liquid crystal display structure comprising:
    first and second laminate assemblies spaced from one another in a substantially parallel relationship, said first and second laminate assemblies having a layer of liquid crystal material confined therebetween by a seal means;
    each of said laminate assemblies including, in order from said liquid crystal material layer, an alignment layer; a conductive electrode structure; a silylated polyvinyl alcohol light-polarizing layer stabilized by organosilylation treatment against humidity and heat; and a polymeric support for said layers.

2. The liquid crystal display structure claimed in claim 1, wherein each of said polymeric supports comprises a biaxially oriented and birefringent polymeric material.

3. The liquid crystal display structure claimed in claim 2, wherein each of said biaxially oriented birefringement polymeric supports comprises polyethylene terephthalate.

4. The liquid crystal display structure claimed in claim 1, wherein each of said silylated polarizing layers in a linear dichroic polarizing layer comprising an iodine-stained and borated stretched layer of polyvinyl alcohol.

5. The liquid crystal display structure claimed in claim 1, wherein each of said silylated polarizing layers is a linear dichroic polarizing layer comprising a stretched polyvinyl alcohol sheet containing polyvinylene light-polarizing molecules.

6. The liquid crystal display structure claimed in claim 1, wherein each of said silylated polyvinyl alcohol light-polarizing layers is obtained by organosilylation of a polyvinyl alcohol light-polarizing layer.

7. The liquid crystal display structure claimed in claim 6, wherein said organosilylation comprises treating said light-polarizing layer with a hydrolyzed organosilane and heating said layer to bond said hydrolyzed organosilane to the surface thereof.

8. The liquid crystal display structure claimed in claim 7, wherein said organosilane comprises N-2-aminoethyl-3-aminopropyl-trimethoxysilane.

9. The liquid crystal display structure claimed in claim 7, wherein said organosilane comprises 3-N-methylaminopropyl-trimethoxysilane.

10. The liquid crystal display structure claimed in claim 1, wherein said electrode structure comprises a layer of silver sandwiched between a pair of dielectric layers.

11. The liquid crystal display structure claimed in claim 10, wherein said electrode structure comprises a layer of silver sandwiched between a pair of titanium dioxide layers.

12. The liquid crystal display structure claimed in claim 1, wherein said electrode structure is positioned directly on the surface of said silylated polyvinyl alcohol light-polarizing layer.

13. The liquid crystal display structure claimed in claim 3, wherein a light reflective layer is positioned in one of said laminate assemblies between said polymeric support and said light-polarizing layer.

* * * * *